United States Patent
Huang et al.

(10) Patent No.: US 11,805,495 B2
(45) Date of Patent: Oct. 31, 2023

(54) DYNAMIC SWITCHING OF PHYSICAL UPLINK CONTROL CHANNEL (PUCCH) BETWEEN UPLINK (UL) AND SUPPLEMENTARY UPLINK (SUL)

(71) Applicant: QUALCOMM Incorporated, San Diego, CA (US)

(72) Inventors: Yi Huang, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/443,363

(22) Filed: Jul. 26, 2021

(65) Prior Publication Data

US 2022/0046599 A1    Feb. 10, 2022

Related U.S. Application Data

(60) Provisional application No. 63/062,368, filed on Aug. 6, 2020.

(51) Int. Cl.
| | |
|---|---|
| *H04W 72/02* | (2009.01) |
| *H04W 72/04* | (2023.01) |
| *H04W 72/0453* | (2023.01) |
| *H04L 1/1867* | (2023.01) |
| *H04L 1/1812* | (2023.01) |
| *H04W 72/21* | (2023.01) |
| *H04W 72/54* | (2023.01) |

(52) U.S. Cl.
CPC ........... *H04W 72/02* (2013.01); *H04L 1/1819* (2013.01); *H04L 1/1896* (2013.01); *H04W 72/0453* (2013.01); *H04W 72/21* (2023.01); *H04W 72/54* (2023.01)

(58) Field of Classification Search
CPC ... H04L 1/1812; H04L 1/1819; H04L 1/1896; H04W 72/02; H04W 72/21; H04W 72/54; H04W 72/0453
See application file for complete search history.

(56) References Cited

U.S. PATENT DOCUMENTS

| | | | |
|---|---|---|---|
| 10,980,062 B1 * | 4/2021 | Babaei | H04L 1/1841 |
| 11,228,990 B2 * | 1/2022 | Jeon | H04W 52/50 |
| 2019/0222361 A1 | 7/2019 | Cheng et al. | |
| 2020/0359403 A1 * | 11/2020 | Lee | H04W 72/21 |

(Continued)

FOREIGN PATENT DOCUMENTS

WO    WO-2020092787 A1    5/2020

OTHER PUBLICATIONS

International Search Report and Written Opinion—PCT/US2021/070973—ISA/EPO—dated Nov. 17, 2021.

*Primary Examiner* — Kent Krueger
(74) *Attorney, Agent, or Firm* — Norton Rose Fullbright US LLP

(57) ABSTRACT

In some aspects, a method of wireless communication includes receiving, at a user equipment (UE) from a base station, a first message indicating a selected carrier for transmission of an uplink (UL) message. The selected carrier includes a UL carrier or a supplementary uplink (SUL) carrier. The UL carrier and the SUL carrier correspond to the same cell. The method further includes transmitting the UL message to the base station via the selected carrier. Other aspects and features are also claimed and described.

30 Claims, 8 Drawing Sheets

(56) References Cited

U.S. PATENT DOCUMENTS

| | | | |
|---|---|---|---|
| 2020/0396760 A1* | 12/2020 | Yi | H04L 1/1864 |
| 2021/0105812 A1* | 4/2021 | Rastegardoost | H04L 1/08 |
| 2021/0135946 A1* | 5/2021 | Babaei | H04L 1/1896 |
| 2021/0266896 A1* | 8/2021 | Choi | H04W 72/21 |
| 2021/0344451 A1* | 11/2021 | Hedayat | H04L 1/1861 |
| 2022/0007399 A1* | 1/2022 | Rastegardoost | H04L 5/0073 |
| 2022/0337456 A1* | 10/2022 | Kwak | H04W 76/11 |
| 2023/0023656 A1* | 1/2023 | Rastegardoost | H04W 72/0446 |

* cited by examiner

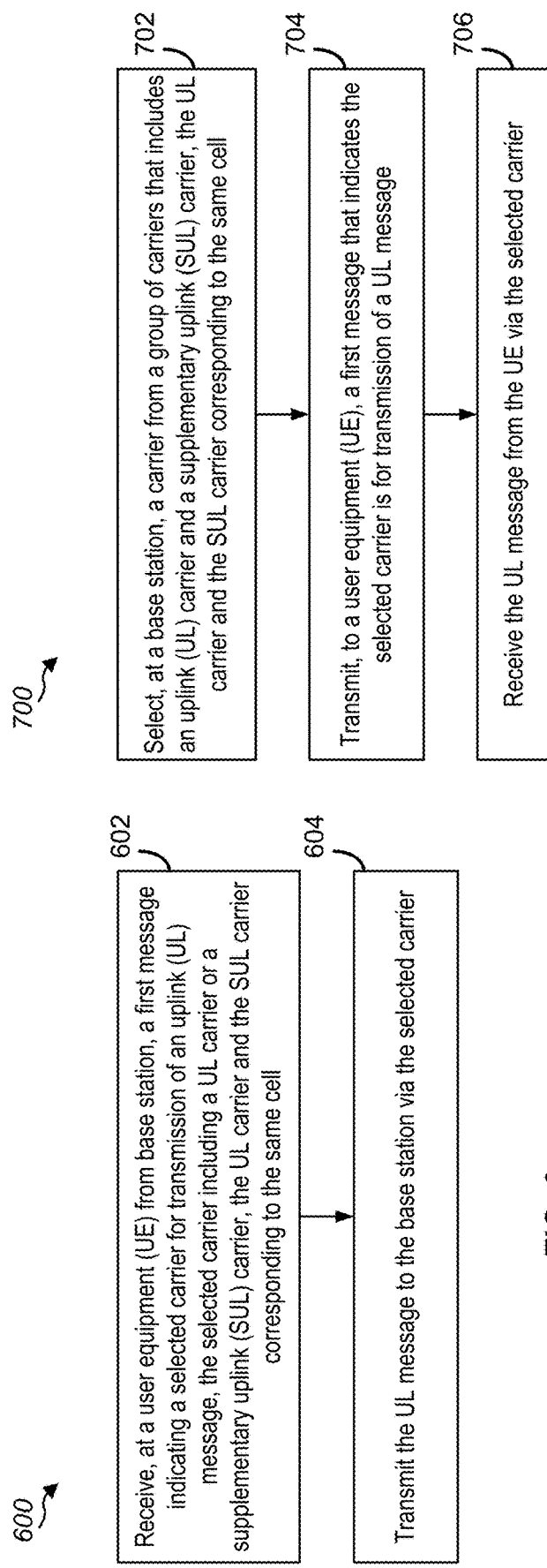

DYNAMIC SWITCHING OF PHYSICAL UPLINK CONTROL CHANNEL (PUCCH) BETWEEN UPLINK (UL) AND SUPPLEMENTARY UPLINK (SUL)

CROSS-REFERENCE TO RELATED APPLICATIONS

This application claims the benefit of U.S. Provisional Patent Application No. 63/062,368, entitled, "DYNAMIC SWITCHING OF PHYSICAL UPLINK CONTROL CHANNEL (PUCCH) BETWEEN UPLINK (UL) AND SUPPLEMENTARY UPLINK (SUL)," filed on Aug. 6, 2020, which is expressly incorporated by reference herein in its entirety.

TECHNICAL FIELD

Aspects of the present disclosure relate generally to wireless communication systems, and more particularly, to dynamically switching of a physical uplink control channel (PUCCH) between an uplink (UL) carrier and a supplementary uplink (SUL) carrier.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Wireless communication systems typically support uplink (UL) communications from a UE to a base station and downlink (DL) communications from the base station to the UE. UL communications may be more susceptible to fading and attenuation due to the UE having a less powerful transmitter than the base station, and thus UL communications may have a shorter range than DL communications. Such difficulties with UL communications may be more pronounced for communications in higher frequency bands, such as the millimeter wave band. To improve UL communication range, some wireless communication systems support UL communications in a cell on a UL carrier and a supplementary uplink (SUL) carrier. The SUL carrier may be a carrier within the same cell that is allocated to lower frequencies than the UL carrier. In some wireless communication systems that support both a UL carrier and a SUL carrier, a PUCCH may be statically, or semi-statically, configured for communication via either the UL carrier or the SUL carrier. However, such wireless communication systems are not able to adapt to changing conditions dynamically, which may result in degraded UL communication quality.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a user equipment (UE) from base station, a first message indicating a selected carrier for transmission of an uplink (UL) message. The selected carrier includes a UL carrier or a supplementary uplink (SUL) carrier. The UL carrier and the SUL carrier correspond to the same cell. The method further includes transmitting the UL message to the base station via the selected carrier.

In an additional aspect of the disclosure, an apparatus configured for wireless communication is disclosed. The apparatus includes at least one processor, and a memory coupled to the at least one processor. The at least one processor is configured to receive, at a UE from base station, a first message indicating a selected carrier for transmission of a UL message. The selected carrier includes a UL carrier or a SUL carrier. The UL carrier and the SUL carrier correspond to the same cell. The at least one processor is further configured to initiate transmission of the UL message to the base station via the selected carrier.

In an additional aspect of the disclosure, an apparatus configured for wireless communication is disclosed. The apparatus includes means for receiving, at a UE from base station, a first message indicating a selected carrier for transmission of a UL message. The selected carrier includes a UL carrier or a SUL carrier. The UL carrier and the SUL carrier correspond to the same cell. The apparatus further includes means for transmitting the UL message to the base station via the selected carrier.

In an additional aspect of the disclosure, a non-transitory computer-readable medium stores instructions that, when executed by a processor, cause the processor to perform operations including receiving, at a UE from base station, a first message indicating a selected carrier for transmission of a UL message. The selected carrier includes a UL carrier or a SUL carrier. The UL carrier and the SUL carrier correspond to the same cell. The operations further include initiating transmission of the UL message to the base station via the selected carrier.

In an additional aspect of the disclosure, a method of wireless communication includes selecting, at a base station, a carrier from a group of carriers that includes a UL carrier and a SUL carrier. The UL carrier and the SUL carrier correspond to the same cell. The method also includes transmitting, to a UE, a first message that indicates the selected carrier is for transmission of a UL message. The method further includes receiving the UL message from the UE via the selected carrier.

In an additional aspect of the disclosure, an apparatus configured for wireless communication is disclosed. The apparatus includes at least one processor, and a memory coupled to the at least one processor. The at least one processor is configured to select, at a base station, a carrier from a group of carriers that includes a UL carrier and a SUL carrier. The UL carrier and the SUL carrier correspond to the same cell. The at least one processor is also configured to initiate transmission, to a UE, of a first message that indicates the selected carrier is for transmission of a UL message. The at least one processor is further configured to receive the UL message from the UE via the selected carrier.

In an additional aspect of the disclosure, an apparatus configured for wireless communication is disclosed. The apparatus includes means for selecting, at a base station, a carrier from a group of carriers that includes a UL carrier and a SUL carrier. The UL carrier and the SUL carrier correspond to the same cell. The apparatus also includes means for transmitting, to a UE, a first message that indicates the selected carrier is for transmission of a UL message. The apparatus further includes means for receiving the UL message from the UE via the selected carrier.

In an additional aspect of the disclosure, a non-transitory computer-readable medium stores instructions that, when executed by a processor, cause the processor to perform operations including selecting, at a base station, a carrier from a group of carriers that includes a UL carrier and a SUL carrier. The UL carrier and the SUL carrier correspond to the same cell. The operations also include initiating transmission, to a UE, of a first message that indicates the selected carrier is for transmission of a UL message. The operations further include receiving the UL message from the UE via the selected carrier.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports dynamic selection of a carrier for transmitting a UL message according to some aspects of the present disclosure.

FIG. 7 is a flow diagram illustrating an example process that supports dynamically indicating a carrier to a UE for transmitting a UL message according to some aspects of the present disclosure.

DETAILED DESCRIPTION

Figure 1:
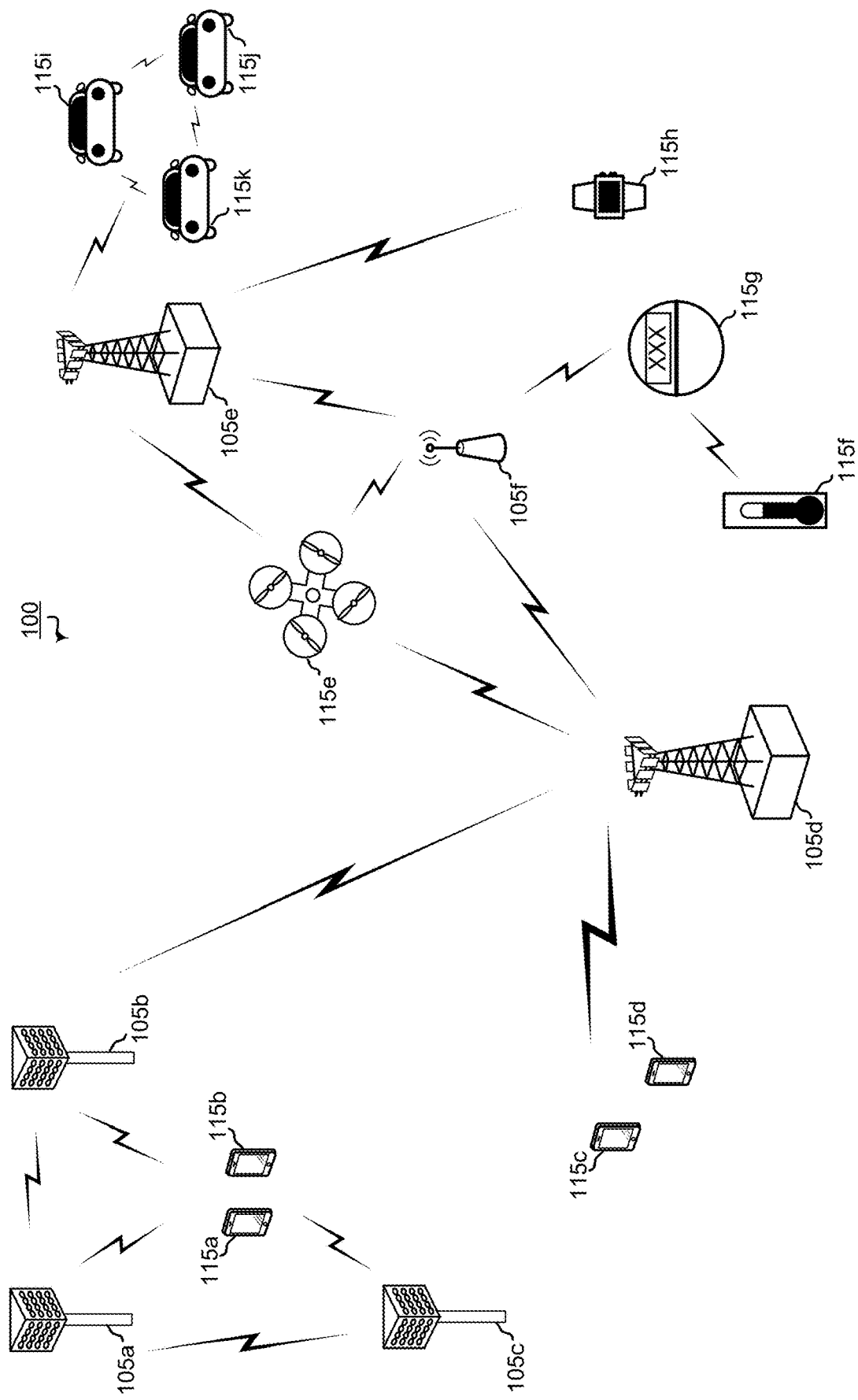
FIG. 1 is a block diagram illustrating details of an example of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media for supporting dynamic selection of a carrier for use in transmission of uplink (UL) messages by a user equipment (UE). The techniques of the present disclosure may provide a wireless communication system that supports a UL carrier and a supplementary uplink (SUL) carrier for UL communications from the UE to a base station. The UL carrier and the SUL carrier may be carriers of a same cell (e.g., a primary cell) supported by the base station, with the SUL being allocated to frequency resources having lower frequency than the frequency resources to which the UL carrier is allocated. The wireless communication system may configure physical uplink control channel (PUCCH) resources on both the UL and SUL resources, and the base station may dynamically indicate to the UE a selected carrier for performing UL transmissions.

To illustrate, the base station may select a carrier, from a group of a UL carrier and a SUL carrier, for use by the UE in transmitting a UL message. The base station may select the carrier based on measurements performed by the base station, measurements received from the UE, or using some other technique, as further described herein. The base station may send a message indicating the selected carrier to the UE. Based on receiving the message, the UE may transmit a UL message to the base station via the selected carrier (e.g., via a PUCCH on the selected carrier). In some implementations, the UL message may include or correspond to a hybrid automatic repeat request acknowledgement (HARQ-ACK) message. For example, the message received from the base station may include or correspond to a downlink control information (DCI) message that includes a particular bit that indicates whether an associated HARQ-ACK message is to be transmitted via the UL carrier or the SUL carrier. In some other implementations, the UL message may include or correspond to a semi-persistent channel state information (SP-CSI) message. For example, the message received from the base station may include or correspond to a medium access control (MAC) control element (MAC-CE) that includes a particular bit that indicates whether an activated SP-CSI resource is on the UL carrier or the SUL carrier. At a later time (e.g., based on changing channel conditions and the like), the base station may select a different carrier and send a message to the UE that indicates the newly selected carrier. In this manner, dynamic switching of a PUCCH from a UL carrier to a SUL carrier, or from a SUL carrier to a UL carrier, may be supported.

Particular implementations of the subject matter described in this disclosure can be implemented to realize one or more of the following potential advantages. In some aspects, the present disclosure provides dynamic selection of a UL carrier or a SUL carrier for use by a UE in transmitting UL messages. Selective use of the SUL carrier may increase the UL transmission range of the wireless communication system, especially for wireless communication systems that support communications in higher frequencies, such as the millimeter wave band. Dynamic selection of the carrier may provide more flexibility and more frequency diversity within the wireless communication system, which may reduce the effects of dynamic interference or jamming on UL transmissions. In some implementations, such dynamic selection may be implemented by a single additional bit in a DCI message or a MAC-CE, which requires minimal changes to legacy wireless communication systems in order to support the dynamic switching.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
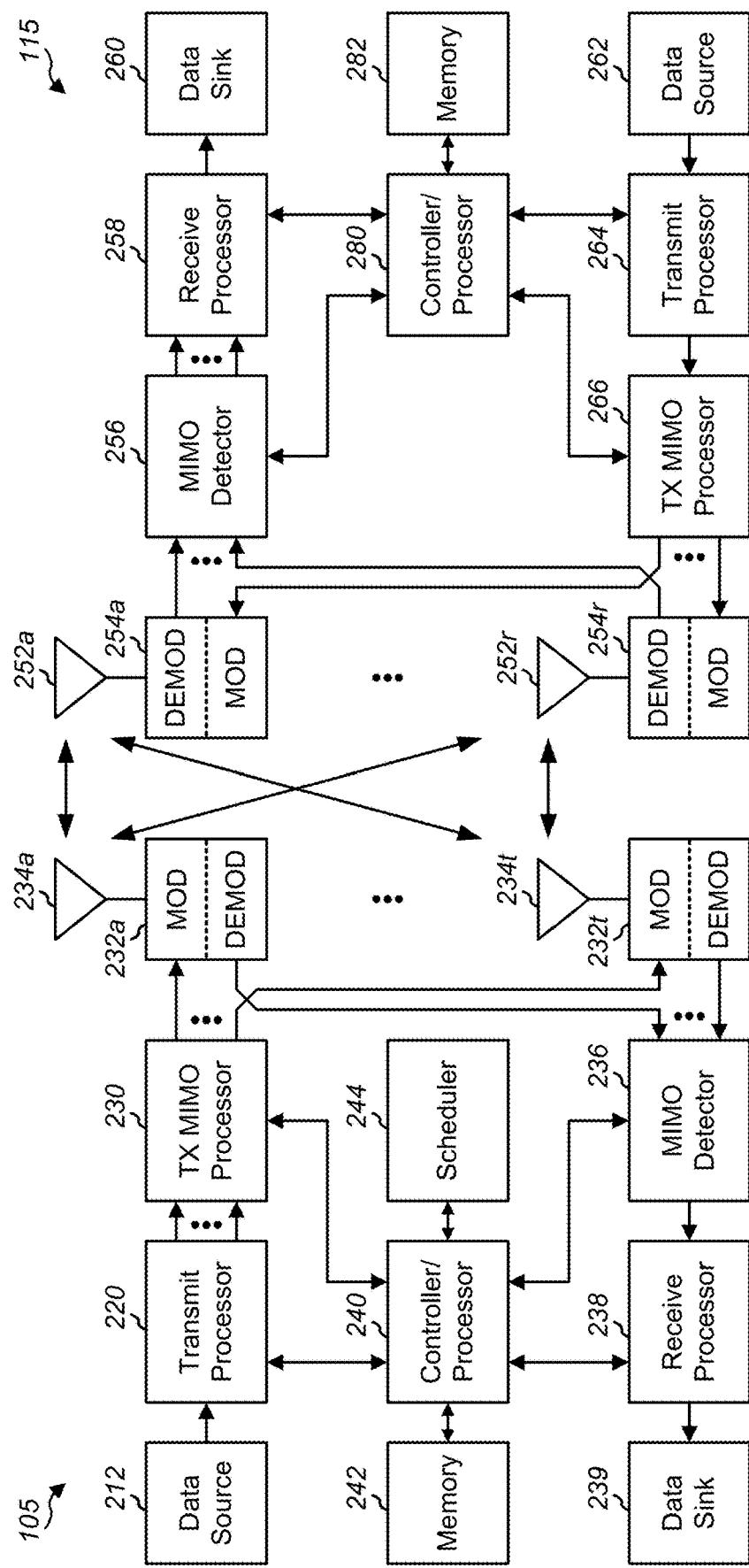
FIG. 2 is a block diagram conceptually illustrating an example design of a base station and a UE configured according to some aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6 and 7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
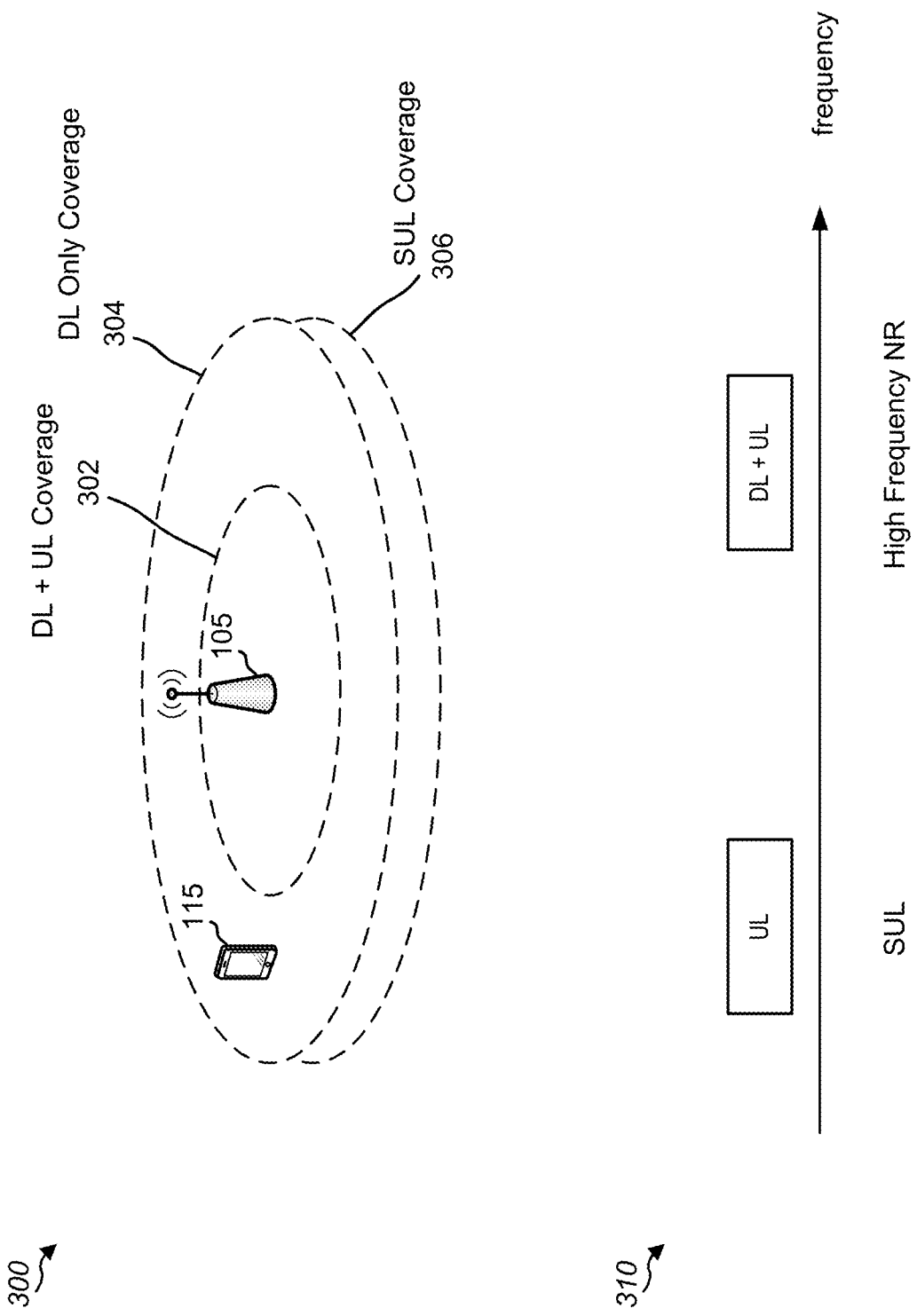
FIG. 3 is a diagram of an example of a wireless communication system configured to support an uplink (UL) carrier and a supplementary uplink (SUL) carrier according to some aspects of the present disclosure.

FIG. 3 is a diagram of an example of a wireless communication system 300 configured to support an uplink (UL) carrier and a supplementary uplink (SUL) carrier according to some aspects. As shown in FIG. 3, the wireless communication system 300 includes a UE 115 and a base station 105. Although one UE 115 and one base station 105 are shown, in other implementations, the wireless communication system 300 may include multiple UEs 115 and multiple base stations 105.

The base station 105 may be configured to support one or more cells, such as a primary cell, a secondary cell, or other cells. Unlike typical carrier aggregation (CA) systems, which support multiple carriers that are each for different respective cells, the base station 105 may be configured to support multiple carriers for a single cell. For example, the base station 105 may be configured to support a UL carrier and a SUL carrier for a particular cell, such as a primary cell. The UL cell and the SUL cell may be allocated to different resources, such as different time resources, different frequency resources, or both, while also being associated with the same cell (e.g., being associated with the same cell identifier (ID)). Due to the differences in frequency resources and the differences in power associated with transmitters of the UE 115 and the base station 105, the different carriers may have different coverage ranges. To illustrate, the wireless communication system 300 may be associated with a DL+UL coverage 302, a DL only coverage 304, and a SUL coverage 306. Due to attenuation of the UL signals, and decreased transmitter power at the UE 115 compared to the base station 105, the DL+UL coverage 302 (e.g., a coverage associated with the UL carrier) is less than the SUL coverage 306. Thus, when the UE 115 is within the SUL coverage 306 but not the DL+UL coverage 302, improved UL transmission quality may be achieved by switching a PUCCH used by the UE 115 to the SUL carrier.

FIG. 3 also shows a frequency diagram 310 illustrating frequency resources allocated to the UL carrier and the SUL carrier. As shown in FIG. 3, the UL carrier (e.g., the DL+UL) may be allocated to frequency resources having higher frequency than the frequency resources allocated to the SUL carrier. As 5G NR wireless communication systems begin to support higher frequency communications, such as in the millimeter wave band, the UL carriers are allocated to these higher frequencies. However, communications at these higher frequencies may be more likely to experience attenuation or jamming. Thus, allocating a SUL carrier to frequency resources at lower frequencies, such as less than 2 gigahertz (GHz), may provide for extended UL transmission coverage in the wireless communication system 300. However, wireless communication systems that are configured for static, or semi-static, carrier selection may not be able to quickly switch the carrier for the PUCCH, resulting in decreased UL transmission quality in the wireless communication system 300.

The present disclosure provides systems, apparatus, methods, and computer-readable media for supporting dynamic selection of a carrier for use in transmission of UL messages by a UE. The techniques of the present disclosure may provide a wireless communication system that supports a UL carrier and a SUL carrier for UL communications from the UE to a base station. The UL carrier and the SUL carrier may be carriers of a same cell (e.g., a primary cell) supported by the base station, with the SUL being allocated to frequency resources having lower frequency than the frequency resources to which the UL carrier is allocated. The wireless communication system may configure PUCCH resources on both the UL and SUL resources, and the base station may dynamically indicate to the UE a selected carrier for performing UL transmissions.

To illustrate, the base station may select a carrier, from a group of a UL carrier and a SUL carrier, for use by the UE in transmitting a UL message. The base station may select the carrier based on measurements performed by the base station, measurements received from the UE, or using some other technique, as further described herein. The base station may send a message indicating the selected carrier to the UE. Based on receiving the message, the UE may transmit a UL message to the base station via the selected carrier (e.g., via a PUCCH on the selected carrier). In some implementations, the UL message may include or correspond to a hybrid automatic repeat request acknowledgement (HARQ-ACK) message. For example, the message received from the base station may include or correspond to a downlink control information (DCI) message that includes a particular bit that indicates whether an associated HARQ-ACK message is to be transmitted via the UL carrier or the SUL carrier. In some other implementations, the UL message may include or correspond to a semi-persistent channel state information (SP-CSI) message. For example, the message received from the base station may include or correspond to a medium access control (MAC) control element (MAC-CE) that includes a particular bit that indicates whether an activated SP-CSI resource is on the UL carrier or the SUL carrier. At a later time (e.g., based on changing channel conditions and the like), the base station may select a different carrier and send a message to the UE that indicates the newly selected carrier. In this manner, dynamic switching of a PUCCH from a UL carrier to a SUL carrier, or from a SUL carrier to a UL carrier, may be supported.

Particular implementations of the subject matter described in this disclosure can be implemented to realize one or more of the following potential advantages. In some aspects, the present disclosure provides dynamic selection of a UL carrier or a SUL carrier for use by a UE in transmitting UL messages. Selective use of the SUL carrier may increase the UL transmission range of the wireless communication system, especially for wireless communication systems that support communications in higher frequencies, such as the millimeter wave band. Dynamic selection of the carrier may provide more flexibility and more frequency diversity within the wireless communication system, which may reduce the effects of dynamic interference or jamming on UL transmissions. In some implementations, such dynamic selection may be implemented by a single additional bit in a DCI message or a MAC-CE, which requires minimal changes to legacy wireless communication systems in order to support the dynamic switching.

Figure 4:
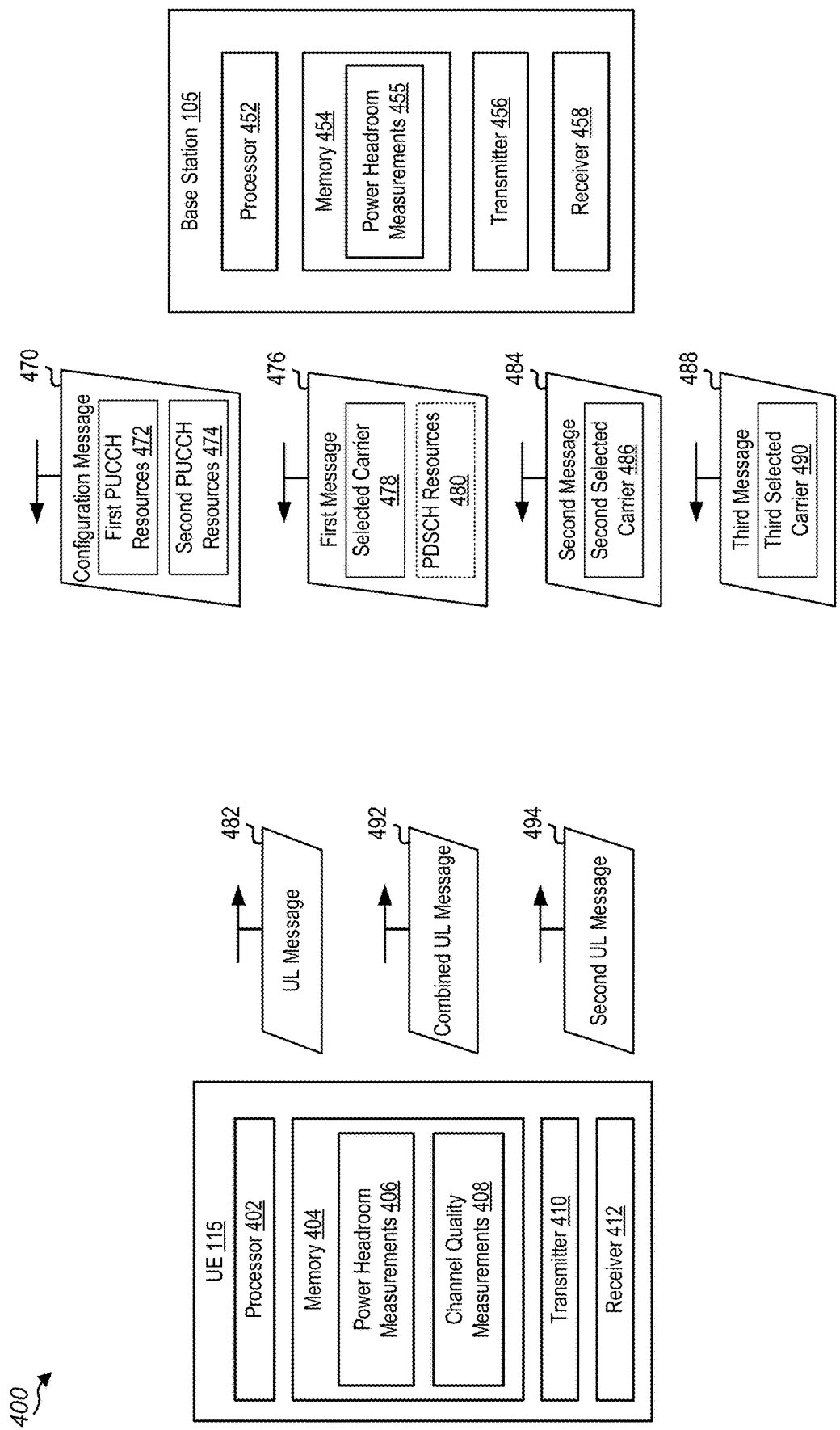
FIG. 4 is a block diagram of an example of a wireless communications system configured to support dynamic switching of a physical uplink control channel (PUCCH) from a UL carrier to a SUL carrier according to some aspects of the present disclosure.

FIG. 4 is a block diagram of an example wireless communications system 400 that supports dynamic switching of a PUCCH from a UL carrier to a SUL carrier according to some aspects. In some examples, the wireless communications system 400 may implement aspects of the wireless network 100. The wireless communications system 400 includes the UE 115 and the base station 105. Although one UE 115 and one base station 105 are illustrated, in some other implementations, the wireless communications system 400 may generally include multiple UEs 115, and may include more than one base station 105.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 410 (hereinafter referred to collectively as "the transmitter 410"), and one or more receivers 412 (hereinafter referred to collectively as "the receiver 412"). The processor 402 may be configured to execute instructions stored in the memory 404 to perform the operations described herein. In some implementations, the processor 402 includes or corresponds to one or more of the receive processor 258, the transmit processor 264, and the controller/processor 280, and the memory 404 includes or corresponds to the memory 282.

In some implementations, the memory 404 may be configured to store power headroom measurements 406 and channel quality measurements 408. The power headroom measurements 406 may indicate available power headroom (as compared to a maximum power) associated with one or more channels measured by the UE 115. The channel quality measurements 408 may indicate channel quality of one or more channels measured by the UE 115, and may be used by the UE 115 to transmit channel state information (CSI) to the base station 105.

The transmitter 410 is configured to transmit reference signals, control information and data to one or more other devices, and the receiver 412 is configured to receive references signals, synchronization signals, control information and data from one or more other devices. For example, the transmitter 410 may transmit signaling, control information and data to, and the receiver 412 may receive signaling, control information and data from, the base station 105. In some implementations, the transmitter 410 and the receiver 412 may be integrated in one or more transceivers. Additionally or alternatively, the transmitter 410 or the receiver 412 may include or correspond to one or more components of the UE 115 described with reference to FIG. 2.

The base station 105 can include a variety of components (such as structural, hardware components) used for carrying out one or more functions described herein. For example, these components can include one or more processors 452 (hereinafter referred to collectively as "the processor 452"), one or more memory devices 454 (hereinafter referred to collectively as "the memory 454"), one or more transmitters 456 (hereinafter referred to collectively as "the transmitter 456"), and one or more receivers 458 (hereinafter referred to collectively as "the receiver 458"). The processor 452 may be configured to execute instructions stored in the memory 454 to perform the operations described herein. In some implementations, the processor 452 includes or corresponds to one or more of the receive processor 238, the transmit processor 220, and the controller/processor 240, and the memory 454 includes or corresponds to the memory 242.

In some implementations, the memory 454 may be configured to store power headroom measurements 455. The power headroom measurements 455 may indicate available power headroom (as compared to a maximum power) associated with one or more channels measured by the base station 105.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of base station 105 described with reference to FIG. 2.

In some implementations, the wireless communications system 400 implements a 5G New Radio (NR) network. For example, the wireless communications system 400 may include multiple 5G-capable UEs 115 and multiple 5G-capable base stations 105, such as UEs and base stations configured to operate in accordance with a 5G NR network protocol such as that defined by the 3GPP.

During operation of the wireless communications system 400, to support enhanced flexibility and increased frequency diversity, the wireless communications system 400 may support dynamic switching of a carrier of a carrier for use in transmission of one or more UL messages by the UE 115. To support the dynamic switching, the base station 105 may configure PUCCH resources on multiple carriers, such as multiple carriers associated with a single cell (e.g., a primary cell) supported by the base station 105, and the base station 105 may select (e.g., activate) a particular carrier for use by the UE 115 in transmitting one or more UL messages via a PUCCH.

In some implementations, the multiple carriers may include at least a UL carrier and a SUL carrier. Unlike typical CA systems, which support multiple carriers that are each for different respective cells, the base station 105 may be configured to support multiple carriers for a single cell. For example, the base station 105 may be configured to support the UL carrier and the SUL carrier for a particular cell, such as a primary cell, and thus the UL carrier and the SUL carrier may be associated with the same logical cell index. The UE 115 may be scheduled to transmit either on the SUL carrier or on the UL carrier, but not on both simultaneously. The UL carrier may correspond to a first set of frequency resources, and the SUL carrier may correspond to a second set of frequency resources. In some implementations, the second set of frequency resources may occupy lower bandwidths than the first set of frequency resources. For example, the first set of frequency resources that correspond to the UL carrier may be located within the millimeter wave band, or other high frequency bandwidths that are typical of 5G NR wireless communication systems. The second set of frequency resources that correspond to the SUL carrier may be located below 2 GHz, such as in NR band n80, n81, n82, n83, n84, or n86, as non-limiting examples.

To configure PUCCH resources, the base station 105 may determine an allocation of first PUCCH resources 472 for the UL carrier and an allocation of second PUCCH resources 474 for the SUL carrier. The PUCCH resources 472-474 may include or correspond to one or more time resources, such as symbols, slots, and the like, one or more frequency resources, such as resource blocks (RBs), or a combination thereof, that are designated for use by the UE 115 in transmitting messages to the base station 105 via PUCCHs. The PUCCH resources 472-474 may be a portion or an entirety of the resources designated for the respective carrier. Although allocation of PUCCH resources to two carriers (e.g., the UL carrier and the SUL carrier) is described, in other implementations, the base station 105 may allocate PUCCH resources to more than two carriers (e.g., the UL carrier and multiple SUL carriers, or other carriers). After determining the PUCCH resource allocations, the base station 105 may generate and transmit a configuration message 470 to the UE 115. The configuration message 470 may indicate the first PUCCH resources 472 allocated to the UL carrier and the second PUCCH resources 474 allocated to the SUL carrier. In some implementations, the configuration message 470 may include or correspond to a radio resource control (RRC) message. In other implementations, the configuration message 470 may include or correspond to another type of message.

After transmitting the configuration message 470, the base station 105 may select a carrier to be activated for use by the UE 115 in transmitting UL messages. In some implementations, the base station 105 may select the carrier from the group of the UL carrier and the SUL carrier. In other implementations, the base station 105 may select the carrier from a group including more than two carriers. The base station 105 may select a selected carrier 478 based on measurements performed by the base station 105, information received from the UE 115, priorities associated with the UL carrier and the SUL carrier, other information, or a combination thereof. As described herein, the UL carrier may have a higher priority than the SUL carrier, such that the UL carrier is selected in situations in which either carrier may provide sufficient performance. In other implementations, the SUL carrier may have a higher priority than the UL carrier, and the operations described herein may be performed to favor the SUL carrier instead of the UL carrier.

In some implementations, the base station 105 may select the selected carrier 478 based on the power headroom measurements 455. For example, the base station 105 may measure a power headroom associated with the UL carrier, and the base station 105 may select the UL carrier (e.g., based on higher priority) as the selected carrier 478 if the power headroom satisfies a threshold. If the power headroom associated with the UL carrier fails to satisfy the threshold, the base station 105 selects the SUL carrier as the selected carrier 478.

In some other implementations, the base station 105 may select the selected carrier 478 based on channel state information (CSI) received from the UE 115. To illustrate, the UE 115 may measure the channel quality measurements 408 associated with the UL carrier and the SUL carrier. The UE 115 may transmit one or more CSI messages to the base station 105 based on the channel quality measurements 408, such as a first CSI message associated with the UL carrier and a second CSI message associated with the SUL carrier (or a single CSI message that indicates CSI associated with both carriers). The base station 105 may determine which carrier is associated with a higher channel quality based on the CSI message(s), and the base station 105 may select the carrier associated with the higher channel quality as the selected carrier 478.

In some other implementations, the base station 105 may select the selected carrier 478 based on sounding reference signals (SRSs) received from the UE 115. To illustrate, the UE 115 may transmit a first SRS to the base station 105 via the first UL carrier, and the UE 115 may transmit a second SRS to the base station 105 via the second UL carrier. The base station 105 may determine which carrier is associated with a higher channel quality based on the SRSs, and the base station 105 may select the carrier associated with the higher channel quality as the selected carrier 478.

After selecting the selected carrier 478, the base station 105 may generate and transmit a first message 476 to the UE 115. The first message 476 may indicate the selected carrier 478 (e.g., either the UL carrier or the SUL carrier, as non-limiting examples) for transmission of one or more UL signals by the UE 115. After receiver the first message 476, the UE 115 may transmit one or more UL messages, such as a UL message 482, to the base station 105 via the selected carrier 478. For example, if the selected carrier 478 is the UL carrier, the UE 115 may transmit the UL message 482 to the base station 105 via a PUCCH within the first PUCCH resources 472 (e.g., the resources corresponding to the UL carrier). Alternatively, if the selected carrier 478 is the SUL carrier, the UE 115 may transmit the UL message 482 to the base station 105 via a PUCCH within the second PUCCH resources 474 (e.g., the resources corresponding to the SUL carrier).

The UL message 482 may be a type of message that is scheduled, or activated, for transmission via a PUCCH, and the message type of the first message 476 may correspond to the message type of the UL message 482. In some implementations, the UL message 482 may include or correspond to a hybrid automatic repeat request acknowledgement (HARQ-ACK) message, and the first message 476 may include or correspond to a downlink control information (DCI) message. For example, the base station 105 may transmit the first message 476 as a DCI message that indicates the selected carrier 478 to the UE 115, such as within a physical downlink control channel (PDCCH), and the UE 115 may transmit a HARQ-ACK to the base station 105 for the UL message 482. The UE 115 may transmit the HARQ-ACK via either the first PUCCH resources 472 or the second PUCCH resources 474, based on whether the UL carrier or the SUL carrier is the selected carrier 478. In some implementations, the DCI message (e.g., the first message 476) includes a particular bit that is configured to indicate the selected carrier 478. For example, a padding bit, a reserved bit, an additional bit, or another bit of the DCI message may be configured to have either a first value that indicates the UL carrier is the selected carrier 478 or a second value that indicates that the SUL is the selected carrier 478. In addition to indicating the selected carrier 478, the DCI message (e.g., the first message 476) may indicate scheduling of a physical downlink shared channel (PDSCH) for the UE 115, and the HARQ-ACK message may indicate acknowledgement of receipt of the PDSCH at the UE 115. For example, the DCI message (e.g., the first message 476) may indicate PDSCH resources 480 for use by the UE 115 in receiving a scheduled PDSCH transmission from the base station 105.

In some implementations, the UE 115 may be scheduled for transmission of a respective HARQ-ACK message on each of the UL carrier and SUL carrier that overlap in time (e.g., in the time domain). To illustrate, the base station 105 may transmit a second message 484 (e.g., a second DCI message) to the UE 115 at a first time and a third message 488 (e.g., a third DCI message) to the UE 115 at a second time (e.g., subsequent to the first time). The second message 484 may indicate a second selected carrier 486 for transmission of a second HARQ-ACK message, and the third message 488 may indicate a third selected carrier 490 for transmission of a third HARQ-ACK message. The second selected carrier 486 may be different than the third selected carrier 490 (e.g., the second selected carrier 486 may be the UL carrier and the third selected carrier 490 may be the SUL carrier, or the second selected carrier 486 may be the SUL carrier and the third selected carrier 490 may be the UL carrier). Because the UE 115 is not permitted to transmit UL messages via the UL carrier and the SUL carrier simultaneously, the UE 115 may combine multiple HARQ-ACK messages into a single combined HARQ-ACK message for transmission via one of the UL carrier or the SUL carrier based on a determination that one or more time resources of the first PUCCH resources 472 allocated to the UL carrier overlap with one or more time resources of the second PUCCH resources 474 allocated to the SUL carrier.

The UE 115 may select the carrier for transmitting the combined HARQ-ACK message based on receipt times of the second message 484 and the third message 488, priority of the carriers, the amount of PUCCH resources associated with each of the carriers, measurements performed by the UE 115, other information, or a combination thereof, as further described with reference to FIG. 5. In some implementations, the UE 115 may select the carrier for transmitting the combined HARQ-ACK message based on receipt times of the second message 484 and the third message 488. For example, if the UE 115 receives the third message 488 after receiving the second message 484, the UE 115 may generate and transmit a combined UL message 492 (e.g., a combined HARQ-ACK message) to the base station 105 via the third selected carrier 490. By selecting the carrier indicated by the last received message, the UE 115 uses the carrier selected by the base station 105 based on the most recent information, such as the most recent channel conditions associated with the UL carrier and the SUL carrier, which may improve the quality of the UL communication process.

In some other implementations, the UE 115 may select the carrier for transmitting the combined UL message 492 (e.g., the combined HARQ-ACK message) based on priorities of the carriers. For example, if UL carrier has a higher priority than the SUL carrier and the UE 115 determines that either the second selected carrier 486 or the third selected carrier 490 is the UL carrier, the UE 115 may generate and transmit the combined UL message 492 to the base station 105 via the UL carrier (e.g., via the first PUCCH resources 472). Alternatively, if SUL carrier has a higher priority than the UL carrier and the UE 115 determines that either the second selected carrier 486 or the third selected carrier 490 is the SUL carrier, the UE 115 may generate and transmit the combined UL message 492 to the base station 105 via the SUL carrier (e.g., via the second PUCCH resources 474). Because the higher priority carrier may be associated with better average channel conditions, using the higher priority carrier may typically improve quality of the UL communication process.

In some other implementations, the UE 115 may select the carrier for transmitting the combined UL message 492 (e.g., the combined HARQ-ACK message) based on the amount of PUCCH resources associated with each of the carriers. For example, the UE 115 may determine whether the second selected carrier 486 or the third selected carrier 490 is associated with a larger PUCCH resource allocation (e.g., by comparing the amount of the first PUCCH resources 472 to the amount of the second PUCCH resources 474), and the UE 115 may generate and transmit the combined UL message 492 to the base station 105 via the carrier associated with the larger PUCCH allocation. Selecting the carrier associated with the larger PUCCH resource allocation may increase the likelihood that the respective PUCCH allocation is sufficient for transmission of the combined UL message 492, which may be larger than a typical HARQ-ACK message as a result of being a combination of two HARQ-ACK messages.

In some other implementations, the UE 115 may select the carrier for transmitting the combined UL message 492 (e.g., the combined HARQ-ACK message) based on measurements performed by the UE 115. The measurements may include power headroom measurements 406, channel quality measurements 408, other measurements, or a combination thereof. In some such implementations in which the UE 115 selects the carrier based on measurements at the UE 115, the UE 115 may transmit an indicator of the selected carrier to the base station 105 prior to transmitting the combined UL message 492. In some other implementations, the base station 105 may be configured to monitor both the UL carrier and the SUL carrier in response to scheduling HARQ-ACK message transmission via each of the carriers that overlap in time.

As an illustrative example, the UE 115 may select the carrier based on the power headroom measurements 406. To illustrate, if either of the second selected carrier 486 or the third selected carrier 490 are the UL carrier (and the UL carrier is the higher priority carrier), the UE 115 may measure a power headroom associated with the UL carrier. If the power headroom associated with the UL carrier satisfies a threshold, the UE 115 may generate and transmit the combined UL message 492 (e.g., the combined HARQ-ACK message) to the base station 105 via the UL carrier (e.g., via the first PUCCH resources 472). If the power headroom associated with the UL carrier fails to satisfy the threshold, the UE 115 may transmit the combined UL message 492 to the base station via the SUL carrier (e.g., via the second PUCCH resources). Alternatively, if SUL carrier has a higher priority than the UL carrier, and the UE 115 determines that either the second selected carrier 486 or the third selected carrier 490 is the SUL carrier, the UE 115 may measure the power headroom associated with the SUL carrier. If the power headroom associated with the SUL carrier satisfies the threshold, the UE 115 may transmit the combined UL message 492 to the base station 105 via the SUL carrier (e.g., via the second PUCCH resources 474). If the power headroom associated with the SUL carrier fails to satisfy the threshold, the UE 115 may transmit the combined UL message 492 to the base station 105 via the UL carrier (e.g., via the first PUCCH resources 472). Because the higher priority carrier may be associated with better average channel conditions, using the higher priority carrier, if the respective power headroom satisfies the threshold, may typically improve quality of the UL communication process.

As another illustrative example, the UE 115 may select the carrier based on the channel quality measurements 408. To illustrate, the UE 115 may measure a channel quality associated with the second selected carrier 486 and a channel quality associated with the third selected carrier 490. The UE 115 may also determine a preferred carrier from the second selected carrier 486 and the third selected carrier 490 based on the channel quality measurements 408, and the UE 115 may generate and transmit the combined UL message 492 (e.g., the combined HARQ-ACK message) to the base station 105 via the preferred carrier. For example, if the preferred carrier is the UL carrier, the UE 115 may transmit the combined UL message 492 via the first PUCCH resources 472). Alternatively, if the preferred carrier is the SUL carrier, the UE 115 may transmit the combined UL message 492 to the base station via the second PUCCH resources 474. Using the carrier associated with better channel quality may improve quality of the UL communication process.

In some other implementations, the UL message 482 may include or correspond to a semi-persistent channel state information (SP-CSI) message, and the first message 476 may include or correspond to a medium access control (MAC) control element (MAC-CE). For example, the base station 105 may transmit the first message 476 as a MAC-CE that indicates the selected carrier 478 to the UE 115, and the UE 115 may transmit a SP-CSI message to the base station 105 for the UL message 482. The UE 115 may transmit the SP-CSI message (e.g., the UL message 482) via either the first PUCCH resources 472 or the second PUCCH resources 474, based on whether the UL carrier or the SUL carrier is the selected carrier 478. In some implementations, the MAC-CE (e.g., the first message 476) includes a particular bit that is configured to indicate the selected carrier 478. For example, a padding bit, a reserved bit, an additional bit, or another bit of the MAC-CE may be configured to have either a first value that indicates the UL carrier is the selected carrier 478 or a second value that indicates that the SUL is the selected carrier 478. In addition to indicating the selected carrier 478, the MAC-CE (e.g., the first message 476) may indicate activation of an SP-CSI resource for use by the UE 115, and the UE 115 may periodically transmit the SP-CSI message (e.g., the UL message 482) to the base station 105, until subsequent deactivation of the SP-CSI resource or switching of the selected carrier 478 by the base station 105.

To illustrate, after transmission of at least one SP-CSI message, the UE 115 may receive a second MAC-CE indicating a second selected carrier for SP-CSI transmission, and the UE may transmit a second SP-CSI message to the base station via the second selected carrier. For example, instead of indicating a second carrier for HARQ-ACK transmission, the second message 484 may include or correspond to a second MAC-CE that indicates the second selected carrier 486. The base station 105 may transmit the second MAC-CE (e.g., the second message 484) to the UE 115, and the UE 115 may transmit a second UL message 494 (e.g., a SP-CSI message) via the second selected carrier 486 (e.g., via the first PUCCH resources 472 if the second selected carrier 486 is the UL carrier or the second PUCCH resources 474 if the second selected carrier 486 is the SUL carrier). Alternatively, the second MAC-CE (e.g., the second message 484) may indicate deactivation of the SP-CSI resource, and the UE 115 may cease transmission of SP CSI messages based on receiver the second MAC-CE.

As described with reference to FIG. 4, the present disclosure provides techniques for dynamic selection of a carrier (e.g., the UL carrier or the SUL carrier) for use by the UE 115 in transmitting UL messages, such as HARQ-ACK messages or SP-CSI messages. Selective use of the SUL carrier may increase the UL transmission range of the UE 115 due to the SUL carrier occupying lower bandwidths than the UL carrier, which may occupy bandwidths within the millimeter wave band or other high frequencies. Dynamic selection of the carrier may provide more flexibility and more frequency diversity within the wireless communications system 400, which may reduce the effects of dynamic interference or jamming on UL transmissions by the UE 115. In some implementations, such dynamic selection may be implemented by a single additional bit in a DCI message or a MAC-CE, which requires minimal changes to legacy wireless communication systems in order to support the dynamic switching between carriers.

Figure 5:
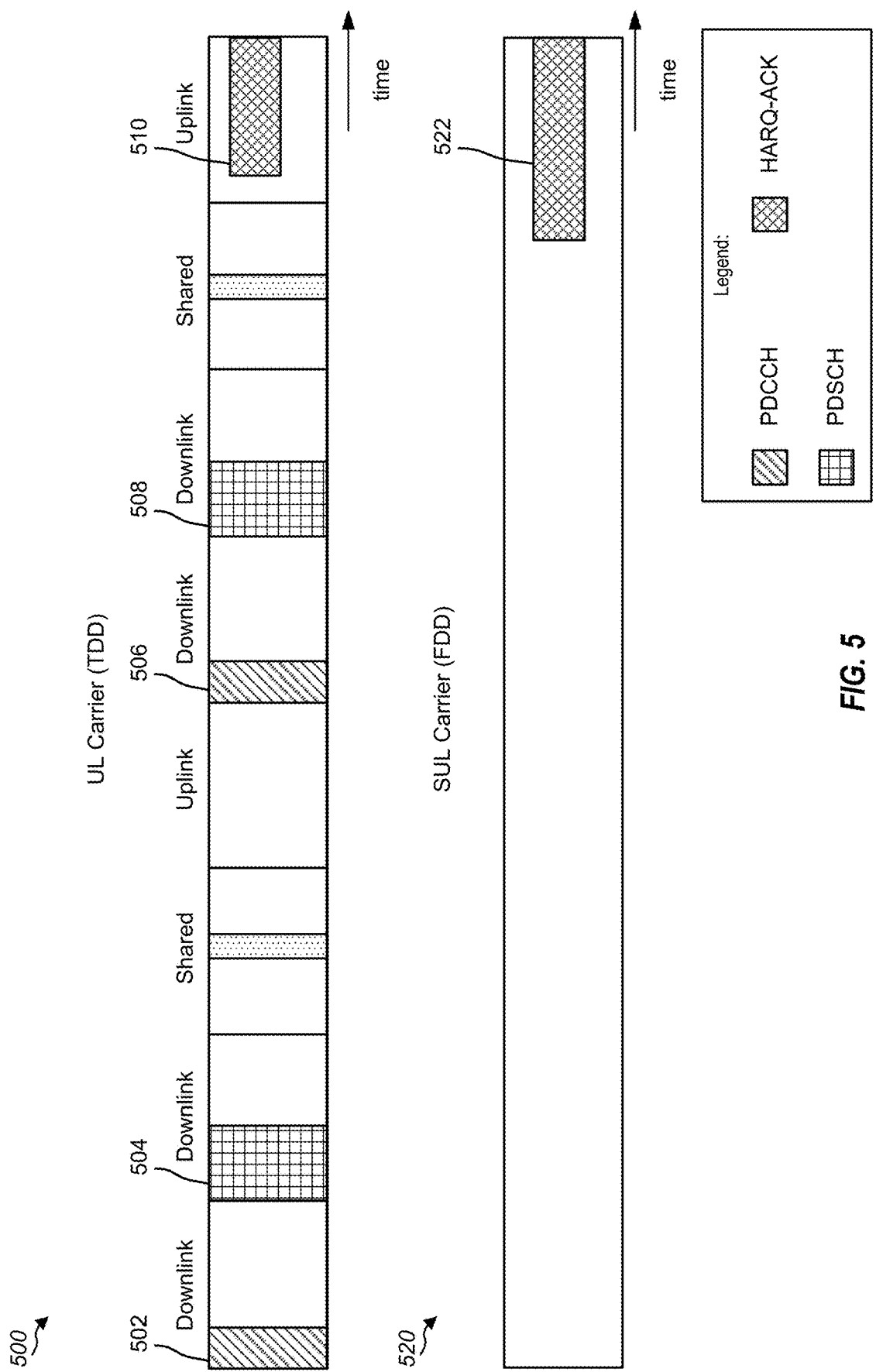
FIG. 5 is a diagram of an example of a UL carrier and a SUL carrier according to some aspects of the present disclosure.

FIG. 5 is a diagram of an example of a UL carrier 500 and a SUL carrier 520 according to some aspects. In some implementations, the UL carrier 500 and the SUL carrier 520 may include or correspond to the UL carrier and the SUL carrier that are configured by the base station 105 of FIG. 4.

Each of the UL carrier 500 and the SUL carrier 520 include a respective plurality of resources designated for wireless communications by a UE and a base station. The resources include time resources (e.g., a plurality of slots, illustrated in FIG. 5 in the horizontal direction) and frequency resources (e.g., a plurality of RBs, illustrated in FIG. 5 in the vertical direction). The UL carrier 500 and the SUL carrier 520 may occupy the same time resources and different frequency resources. In some implementations, the SUL carrier 520 occupies lower frequency bandwidths than the UL carrier 500, to increase the distance of transmission sent using the SUL carrier 520.

In some implementations, the UL carrier 500 may be time division duplexed (TDD) between DL, UL, and shared reservations. In the example shown in FIG. 5, the first slot, the second slot, and a first portion of the third slot may be reserved for DL communications, a second portion of the third slot and the fourth slot may be reserved for UL communications, the fifth slot, the sixth slot, and a first portion of the seventh slot may be reserved for DL communications, and a second portion of the seventh slot and the eighth slot may be reserved for UL communications. In some implementations, the base station may transmit a DCI message via a PDCCH on the UL carrier 500 to assign resources for DL messages and for HARQ-ACK messages responsive to the DL messages. For example, the first slot on the UL carrier 500 may include a first PDCCH 502 that is used to schedule resources for a first PDSCH 504 (e.g., for DL messages) and for first HARQ-ACK resources 510 (e.g., PUCCH resources for HARQ-ACK messages responsive to the DL messages) on the UL carrier 500. In some implementations, the base station may assign a second set of resources before occurrence of the previously assigned HARQ-ACK resources. For example, the fifth slot on the UL carrier 500 may include a second PDCCH 506 that is used to schedule resources for a second PDSCH 508 (e.g., for second DL messages) and for second HARQ-ACK resources 522 (e.g., PUCCH resources for HARQ-ACK messages responsive to the second DL messages) on the SUL carrier 520.

As described with reference to FIG. 4, if the first HARQ-ACK resources 510 and the second HARQ-ACK resources 522 at least partially overlap in time, the UE may combine HARQ-ACK messages and transmit a combined HARQ-ACK message via one of the UL carrier 500 or the SUL carrier 520. This may prevent the UE from transmitting HARQ-ACK messages simultaneously via the UL carrier 500 and the SUL carrier 520, which may not be permitted. UE may determine which carrier to use to transmit the combined HARQ-ACK message based on a variety of information, as described with reference to FIG. 4. In some implementations, the UE may determine the carrier based on priorities of the carriers. For example, if the UL 500 has higher priority than the SUL carrier 520, the UE may transmit the combined HARQ-ACK message via the first HARQ-ACK resources 510 on the UL carrier 500 because at least one of the PDCCHs 502 and 506 indicate selection of the UL carrier 500 for HARQ-ACK message transmission. In some other implementations, the UE may determine the carrier based on time of receipt of the DCI messages. For example, if the DCI message indicating use of the second HARQ-ACK resources 522 is received via the second PDCCH 506 during a later time slot than the first PDCCH 502, the UE may transmit the combined HARQ-ACK message via the second HARQ-ACK resources 522 on the SUL carrier 520 because the most recently received DCI message indicates selection of the SUL carrier 520 for HARQ-ACK message transmission. In some other implementations, the UE may determine the carrier based on the amount of resources allocated for transmission of HARQ-ACK messages. For example, if the second HARQ-ACK resources 522 on the SUL carrier 520 include more resources than the first HARQ-ACK resources 510 on the UL carrier 500 (as illustrated by the larger width of the second HARQ-ACK resources 522 in FIG. 5), the UE may transmit the combined HARQ-ACK message via the second HARQ-ACK resources 522 on the SUL carrier 520. In some other implementations, the UE may select the carrier based on measurements associated with the UL carrier 500 and the SUL carrier 520, as further described with reference to FIG. 4. Thus, the UE may select either the UL carrier 500 (e.g., the first HARQ-ACK resources 510) or the SUL carrier 520 (e.g., the second HARQ-ACK resources 522) for transmission of a combined HARQ-ACK message when assigned HARQ-ACK resources on both the UL carrier 500 and the SUL carrier 520 at least partially overlap in time.

FIG. 6 is a flow diagram illustrating an example process 600 that supports dynamic selection of a carrier for transmitting a UL message according to some aspects. Operations of the process 600 may be performed by a UE, such as the UE 115 described above with reference to FIGS. 1, 2, and 4, or a UE as described with reference to FIG. 8. For example, example operations (also referred to as "blocks") of the process 600 may enable the UE 115 to dynamically select a carrier, from a group of a UL carrier and a SUL carrier, for transmission of a UL message.

In block 602, the UE 115 receives, from base station, a first message indicating a selected carrier for transmission of a UL message. The selected carrier includes a UL carrier or a SUL carrier. The UL carrier and the SUL carrier correspond to the same cell. For example, the first message may include or correspond to the first message 476 and the selected carrier may include or correspond to the selected carrier 478 of FIG. 4.

In block 604, the UE 115 transmits the UL message to the base station via the selected carrier. For example, the UL message may include or correspond to the UL message 482 of FIG. 4.

In some implementations, the UL carrier and the SUL carrier may be associated with the same logical cell index. Additionally or alternatively, the UL carrier may correspond to a first set of frequency resources, and the SUL carrier may correspond to a second set of frequency resources. In some such implementations, the second set of frequency resources may occupy lower bandwidths than the first set of frequency resources.

In some implementations, the process 600 also includes receiving a configuration message from the base station. The configuration message may indicate allocation of a first set of PUCCH resources corresponding to the UL carrier and allocation of a second set of PUCCH resources corresponding to the SUL carrier. In some such implementations, the configuration message may include a RRC message. Additionally or alternatively, the first set of PUCCH resources may include a first set of frequency resources and a first set of time resources corresponding to at least a portion of the UL carrier, and the second set of PUCCH resources may include a second set of frequency resources and a second set of time resources corresponding to at least a portion of the SUL carrier.

In some implementations, the UL message may include a HARQ-ACK message. In some such implementations, the first message may include a DCI message. In some such implementations, a particular bit of the DCI message may be configured to indicate the selected carrier for transmission of the HARQ-ACK message. Additionally or alternatively, the DCI message may further indicate scheduling of a PDSCH, and the HARQ-ACK message may indicate acknowledgment of receipt of the PDSCH at the UE. Additionally or alternatively, the process 600 may further include receiving, from the base station, a second message indicating a second selected carrier for transmission of a second HARQ-ACK message, and receiving, from the base station, a third message indicating a third selected carrier for transmission of a third HARQ-ACK message. In some such implementations, the process 600 may also include, based on a determination that one or more time resources allocated to PUCCH resources corresponding to the UL carrier overlap with one or more time resources allocated to PUCCH resources corresponding to the SUL carrier, transmitting a combined HARQ-ACK message to the base station via the third selected carrier. Alternatively, the process 600 may also include, based on a determination that one or more time resources allocated to PUCCH resources corresponding to the UL carrier overlap with one or more time resources allocated to PUCCH resources corresponding to the SUL carrier and a determination that the second selected carrier or the third selected carrier is the UL carrier, transmitting a combined HARQ-ACK message to the base station via the UL carrier. Alternatively, the process 600 may also include determining, from the second selected carrier and the third selected carrier, a carrier associated with a larger PUCCH resource allocation, and, based on a determination that one or more time resources allocated to PUCCH resources corresponding to the UL carrier overlap with one or more time resources allocated to PUCCH resources corresponding to the SUL carrier, transmitting a combined HARQ-ACK message to the base station via the carrier associated with the larger PUCCH resource allocation. Alternatively, the process 600 may also include measuring a power headroom associated with the UL carrier, and, based on a determination that one or more time resources allocated to PUCCH resources corresponding to the UL carrier overlap with one or more time resources allocated to PUCCH resources corresponding to the SUL carrier, a determination that the second selected carrier or the third selected carrier is the UL carrier, and a determination that the power headroom satisfies a threshold, transmitting a combined HARQ-ACK message to the base station via the UL carrier. Alternatively, the process 600 may also include measuring a channel quality associated with the second selected carrier, measuring a channel quality associated with the third selected carrier, determining a preferred carrier from the second selected carrier and the third selected carrier based on the measured channel qualities, and, based on a determination that one or more time resources allocated to PUCCH resources corresponding to the UL carrier overlap with one or more time resources allocated to PUCCH resources corresponding to the SUL carrier, transmitting a combined HARQ-ACK message to the base station via the preferred carrier.

In some implementations, the UL message may include a SP-CSI message. In some such implementations, the first message may include a MAC-CE indicating activation of a SP-CSI resource at the UE. Additionally or alternatively, the process 600 may further include, after transmitting the SP-CSI message, receiving, from the base station, a second MAC-CE indicating a second selected carrier for SP-CSI transmission, and transmitting a second SP-CSI message to the base station via the second selected carrier.

FIG. 7 is a flow diagram illustrating an example process 700 that supports dynamically indicating a carrier to a UE for transmitting a UL message according to some aspects. Operations of the process 700 may be performed by a base station, such as the base station 105 described above with reference to FIGS. 1, 2, and 4, or a base station as described with reference to FIG. 9. For example, example operations of the process 700 may enable the base station 105 to dynamically select a carrier, from a group of a UL carrier and a SUL carrier, and indicate the selected carrier to a UE for use in transmitting a UL message.

In block 702, the base station 105 selects a carrier from a group of carriers that includes a UL carrier and a SUL carrier. The UL carrier and the SUL carrier correspond to the same cell. For example, the selected carrier may include or correspond to the selected carrier 478 of FIG. 4.

In block 704, the base station 105 transmits, to a UE, a first message that indicates the selected carrier is for transmission of a UL message. For example, the first message may include or correspond to the first message 476 of FIG. 4.

In block 706, the base station 105 receives the UL message from the UE via the selected carrier. For example, the UL message may include or correspond to the UL message 482 of FIG. 4.

In some implementations, the UL carrier and the SUL carrier may be associated with the same logical cell index. Additionally or alternatively, the UL carrier may correspond to a first set of frequency resources, and the SUL carrier may correspond to a second set of frequency resources. In some such implementations, the second set of frequency resources may occupy lower bandwidths than the first set of frequency resources.

In some implementations, the process 700 may further include measuring a power headroom associated with the UL carrier, and selecting the UL carrier as the selected carrier based on the power headroom satisfying a threshold. In some such implementations, the process 700 may also include selecting the SUL carrier as the selected carrier based on the power headroom failing to satisfy the threshold.

In some implementations, the process 700 may further include receiving a first CSI message associated with the UL carrier from the UE, receiving a second CSI message associated with the SUL carrier from the UE, determining a carrier associated with a higher channel quality from the UL carrier and the SUL carrier based on the first CSI message and the second CSI message, and selecting the carrier associated with the higher channel quality as the selected carrier. Alternatively, the process 700 may further include receiving a first SRS from the UE via the UL carrier, receiving a second SRS from the UE via the SUL carrier, determining a carrier associated with a higher channel quality from the UL carrier and the SUL carrier based on the first SRS and the second SRS, and selecting the carrier associated with the higher channel quality as the selected carrier.

In some implementations, the process 700 may also include transmitting a configuration message to the UE. The configuration message may indicate allocation of a first set of PUCCH resources corresponding to the UL carrier and allocation of a second set of PUCCH resources corresponding to the SUL carrier. In some such implementations, the configuration message may include a RRC message. Additionally or alternatively, the first set of PUCCH resources may include a first set of frequency resources and a first set of time resources corresponding to at least a portion of the UL carrier, and the second set of PUCCH resources may include a second set of frequency resources and a second set of time resources corresponding to at least a portion of the SUL carrier.

In some implementations, the UL message may include a HARQ-ACK message. In some such implementations, the first message may include a DCI message. In some such implementations, a particular bit of the DCI message may be configured to indicate the selected carrier for transmission of the HARQ-ACK message. Additionally or alternatively, the DCI message may further indicate scheduling of a PDSCH, and the HARQ-ACK message may indicate acknowledgment of receipt of the PDSCH at the UE. Additionally or alternatively, the process 700 may also include transmitting, to the UE, a second message indicating a second selected carrier for transmission of a second HARQ-ACK message, and transmitting, to the UE, a third message indicating a third selected carrier for transmission of a third HARQ-ACK message. One or more time resources allocated to PUCCH resources corresponding to the UL carrier may overlap with one or more time resources allocated to PUCCH resources corresponding to the SUL carrier. In some such implementations, the process 700 may also include monitoring the third selected carrier according to the PUCCH resources allocated to the third selected carrier, and receiving a combined HARQ-ACK message from the UE via the third selected carrier. Alternatively, the process 700 may also include monitoring the UL carrier according to the PUCCH resources allocated to the UL carrier based on a determination that the second selected carrier or the third selected carrier is the UL carrier, and receiving a combined HARQ-ACK message from the UE via the UL carrier. Alternatively, the process 700 may also include determining, from the second selected carrier and the third selected carrier, a carrier associated with a larger PUCCH resource allocation, monitoring the carrier associated with the larger PUCCH resource allocation after according to the PUCCH resources allocated to the carrier associated with the larger PUCCH allocation, and receiving a combined HARQ-ACK message from the UE via the carrier associated with the larger PUCCH allocation.

In some implementations, the UL message may include a SP-CSI message. In some such implementations, the first message may include a MAC-CE indicating activation of a SP-CSI resource at the UE. In some such implementations, a particular bit of the MAC-CE may be configured to indicate the selected carrier for transmission of the SP-CSI message. Additionally or alternatively, the process 700 may further include, after receiving the SP-CSI message, transmitting, to the UE, a second MAC-CE indicating a second selected carrier for SP-CSI transmission, and receiving a second SP-CSI message from the UE via the second selected carrier.

Figure 8:
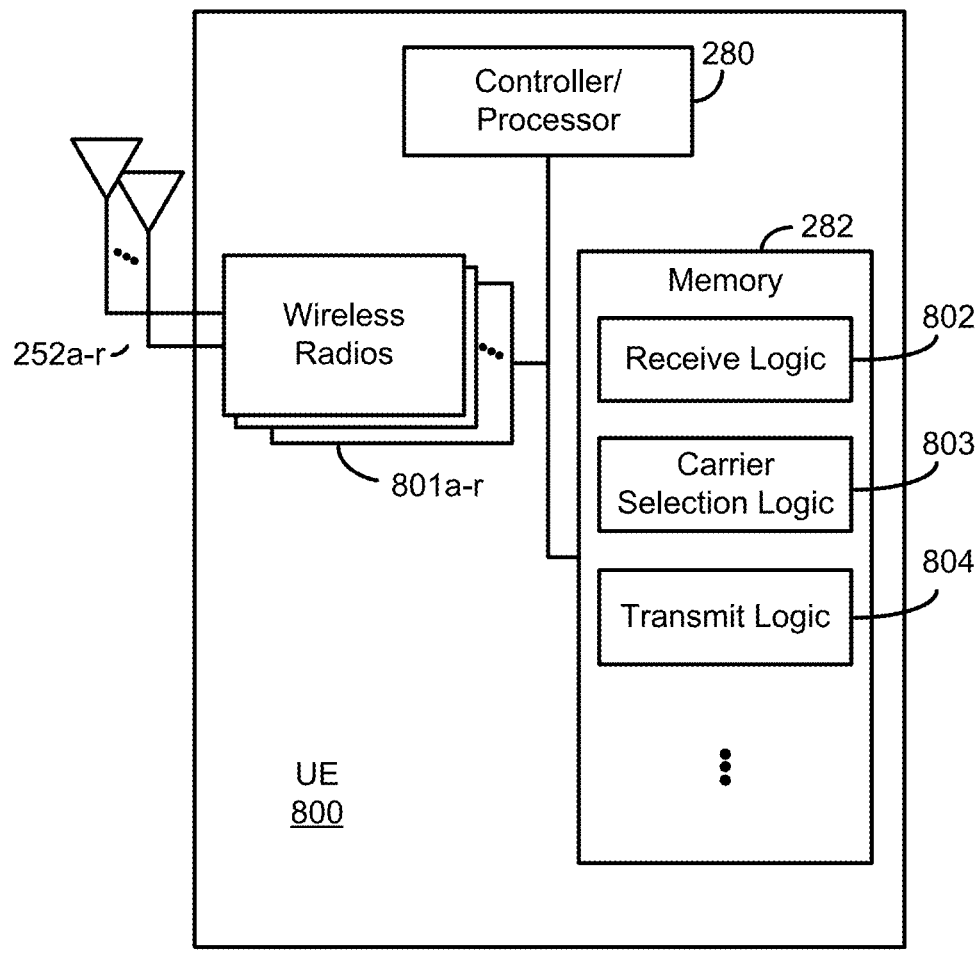
FIG. 8 is a block diagram of an example UE that supports dynamic selection of a carrier for transmitting a UL message according to some aspects of the present disclosure.

FIG. 8 is a block diagram of an example UE 800 that supports dynamic selection of a carrier for transmitting a UL message according to some aspects. The UE 800 may be configured to perform operations, including the blocks of the process 600 described with reference to FIG. 6. In some implementations, the UE 800 includes the structure, hardware, and components shown and described with reference to the UE 115 of FIG. 2 or 4. For example, the UE 800 includes the controller/processor 280, which operates to execute logic or computer instructions stored in the memory 282, as well as controlling the components of the UE 800 that provide the features and functionality of the UE 800. The UE 800, under control of the controller/processor 280, transmits and receives signals via wireless radios 801a-r and the antennas 252a-r. The wireless radios 801a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include receive logic 802, carrier selection logic 803, and transmit logic 804. The receive logic 802 may be configured to enable reception of data or signals, such as configuration messages and scheduling messages, using the wireless radios 801a-r and the antennas 252a-r. The carrier selection logic 803 may be configured to select a carrier, from a group of a UL carrier and a SUL carrier, for transmitting a UL message. The transmit logic 804 may be configured to enable transmission of data or signals, such as a UL message, using the wireless radios 801a-r and the antennas 252a-r. The UE 800 may receive signals from or transmit signals to one or more network entities, such as the base station 105 of FIGS. 1, 2, and 4, or a base station as illustrated in FIG. 9.

In some implementations, the UE 800 may be configured to perform the process 600 of FIG. 6. To illustrate, the UE 800 may execute, under control of the controller/processor 280, the receive logic 802, the carrier selection logic 803, and the transmit logic 804 stored in the memory 282. The execution environment of the receive logic 802 provides the functionality to perform at least the operations in block 602. The execution environment of the carrier selection logic 803 and the transmit logic 804 provides the functionality to perform at least the operations in block 604.

Figure 9:
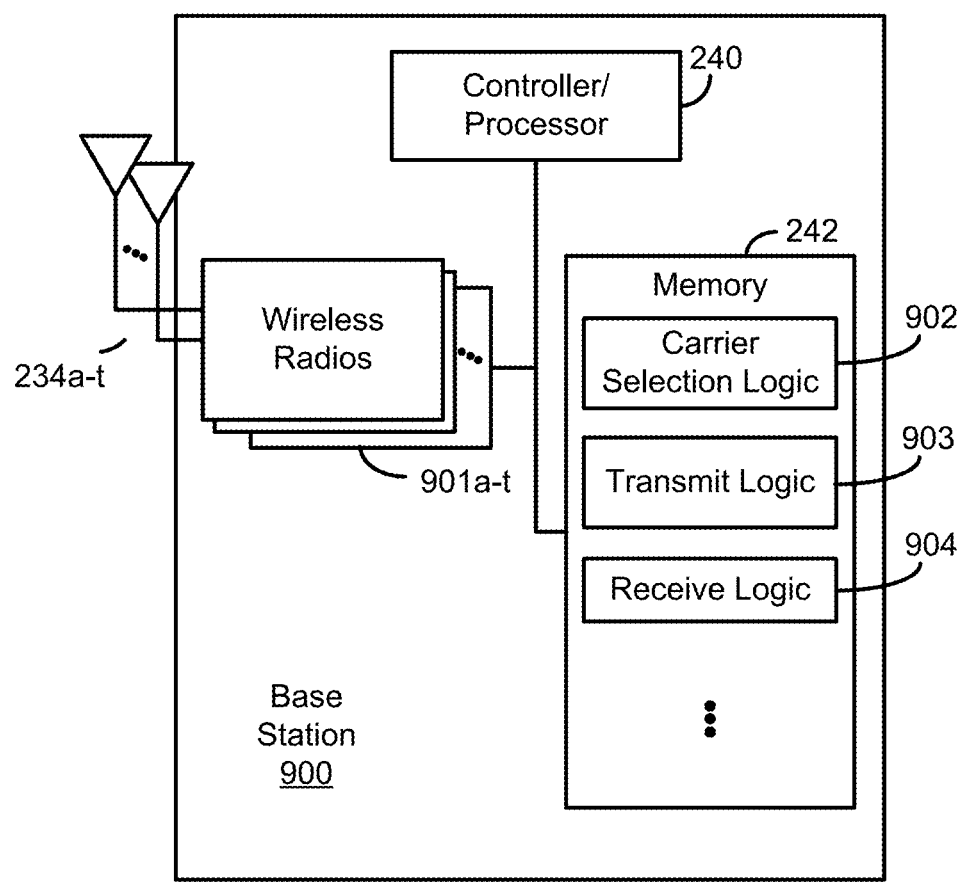
FIG. 9 is a block diagram of an example base station that supports dynamically indicating a carrier to a UE for transmitting a UL message according to some aspects of the present disclosure.

FIG. 9 is a block diagram of an example base station 900 that supports dynamically indicating a carrier to a UE for transmitting a UL message according to some aspects. The base station 900 may be configured to perform operations, including the blocks of the process 700 described with reference to FIG. 7. In some implementations, the base station 900 includes the structure, hardware, and components shown and described with reference to the base station 105 of FIGS. 1, 2, and 4. For example, the base station 900 may include the controller/processor 240, which operates to execute logic or computer instructions stored in the memory 242, as well as controlling the components of the base station 900 that provide the features and functionality of the base station 900. The base station 900, under control of the controller/processor 240, transmits and receives signals via wireless radios 901a-t and the antennas 234a-t. The wireless radios 901a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include carrier selection logic 902, transmit logic 903, and receive logic 904. The carrier selection logic 902 may be configured to select a carrier, from the group of a UL carrier and a SUL carrier, for a UE to use to transmit a UL message. The transmit logic 903 may be configured to enable transmission of data or signals, such as configuration messages and scheduling messages, using the wireless radios 901a-t and the antennas 234a-t. The receive logic 904 may be configured to enable reception of data or signals, such as UL messages, using the wireless radios 901a-t and the antennas 234a-t. The base station 900 may receive signals from or transmit signals to one or more UEs, such as the UE 115 of FIGS. 1, 2, and 4, or the UE 800 of FIG. 8.

In some implementations, the base station 900 may be configured to perform the process 700 of FIG. 7. To illustrate, the base station 900 may execute, under control of the controller/processor 240, the carrier selection logic 902, the transmit logic 903, and the receive logic 904 stored in the memory 242. The execution environment of the carrier selection logic 902 provides the functionality to perform at least the operations in block 702. The execution environment of the transmit logic 903 provides the functionality to perform at least the operations in block 704. The execution environment of the receive logic 904 provides the functionality to perform at least the operations in block 706.

It is noted that one or more blocks (or operations) described with reference to FIGS. 6 and 7 may be combined with one or more blocks (or operations) described with reference to another of the figures. For example, one or more blocks (or operations) of FIG. 6 may be combined with one or more blocks (or operations) of FIG. 7. As another example, one or more blocks associated with FIGS. 8 and 9 may be combined with one or more blocks (or operations) associated with FIGS. 2 and 4.

In some aspects, techniques for enabling dynamic selection of a carrier for transmission of a UL message (e.g., via a PUCCH) may include additional aspects, such as any single aspect or any combination of aspects described below or in connection with one or more other processes or devices described elsewhere herein. In some aspects, enabling dynamic selection of a carrier for transmission of a UL message may include an apparatus configured to receive, from base station, a first message indicating a selected carrier for transmission of a UL message. The selected carrier includes a UL carrier or a SUL carrier. The UL carrier and the SUL carrier correspond to the same cell. The apparatus may further be configured to transmit the UL message to the base station via the selected carrier. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the UL carrier and the SUL carrier are associated with the same logical cell index.

In a second aspect, alone or in combination with the first aspect, the UL carrier corresponds to a first set of frequency resources. The SUL carrier corresponds to a second set of frequency resources.

In a third aspect, in combination with the second aspect, the second set of frequency resources occupies lower bandwidths than the first set of frequency resources.

In a fourth aspect, alone or in combination with one or more of the first through third aspects, the apparatus is configured to receive a configuration message from the base station. The configuration message indicates allocation of a first set of physical uplink control channel (PUCCH) resources corresponding to the UL carrier and allocation of a second set of PUCCH resources corresponding to the SUL carrier.

In a fifth aspect, in combination with the fourth aspect, the configuration message includes a radio resource control (RRC) message.

In a sixth aspect, in combination with one or more of the fourth through fifth aspects, the first set of PUCCH resources include a first set of frequency resources and a first set of time resources corresponding to at least a portion of the UL carrier. The second set of PUCCH resources include a second set of frequency resources and a second set of time resources corresponding to at least a portion of the SUL carrier.

In a seventh aspect, alone or in combination with one or more of the first through sixth aspects, the UL message includes a hybrid automatic repeat request acknowledgement (HARQ-ACK) message.

In an eighth aspect, in combination with the seventh aspect, the first message includes a downlink control information (DCI) message.

In a ninth aspect, in combination with the eighth aspect, a particular bit of the DCI message is configured to indicate the selected carrier for transmission of the HARQ-ACK message.

In a tenth aspect, in combination with one or more of the eighth through ninth aspects, the DCI message further indicates scheduling of a physical downlink shared channel (PDSCH). The HARQ-ACK message indicates acknowledgment of receipt of the PDSCH at the apparatus.

In an eleventh aspect, in combination with one or more of the eighth through tenth aspects, the apparatus is configured to receive, from the base station, a second message indicating a second selected carrier for transmission of a second HARQ-ACK message.

In a twelfth aspect, in combination with the eleventh aspect, the apparatus is configured to receive, from the base station, a third message indicating a third selected carrier for transmission of a third HARQ-ACK message.

In a thirteenth aspect, in combination with one or more of the eleventh through twelfth aspects, the apparatus is configured to, based on a determination that one or more time resources allocated to physical uplink control channel (PUCCH) resources corresponding to the UL carrier overlap with one or more time resources allocated to PUCCH resources corresponding to the SUL carrier, transmit a combined HARQ-ACK message to the base station via the third selected carrier.

In a fourteenth aspect, in combination with one or more of the eleventh through twelfth aspects, the apparatus is configured to, based on a determination that one or more time resources allocated to physical uplink control channel (PUCCH) resources corresponding to the UL carrier overlap with one or more time resources allocated to PUCCH resources corresponding to the SUL carrier and a determination that the second selected carrier or the third selected carrier is the UL carrier, transmit a combined HARQ-ACK message to the base station via the UL carrier.

In a fifteenth aspect, in combination with one or more of the eleventh through twelfth aspects, the apparatus is configured to determine, from the second selected carrier and the third selected carrier, a carrier associated with a larger physical uplink control channel (PUCCH) resource allocation.

In a sixteenth aspect, in combination with the fifteenth aspect, the apparatus is configured to, based on a determination that one or more time resources allocated to PUCCH resources corresponding to the UL carrier overlap with one or more time resources allocated to PUCCH resources corresponding to the SUL carrier, transmit a combined HARQ-ACK message to the base station via the carrier associated with the larger PUCCH resource allocation.

In a seventeenth aspect, in combination with one or more of the eleventh through twelfth aspects, the apparatus is configured to measure a power headroom associated with the UL carrier.

In a eighteenth aspect, in combination with the seventeenth aspect, the apparatus is configured to, based on a determination that one or more time resources allocated to physical uplink control channel (PUCCH) resources corresponding to the UL carrier overlap with one or more time resources allocated to PUCCH resources corresponding to the SUL carrier, a determination that the second selected carrier or the third selected carrier is the UL carrier, and a determination that the power headroom satisfies a threshold, transmit a combined HARQ-ACK message to the base station via the UL carrier.

In a nineteenth aspect, alone or in combination with one or more of the eleventh through twelfth aspects, the apparatus is configured to measure a channel quality associated with the second selected carrier.

In a twentieth aspect, in combination with the nineteenth aspect, the apparatus is configured to measure a channel quality associated with the third selected carrier.

In a twenty-first aspect, in combination with the twentieth aspect, the apparatus is configured to determine a preferred carrier from the second selected carrier and the third selected carrier based on the measured channel qualities.

In a twenty-second aspect, in combination with the twenty-first aspect, the apparatus is configured to, based on a determination that one or more time resources allocated to physical uplink control channel (PUCCH) resources corresponding to the UL carrier overlap with one or more time resources allocated to PUCCH resources corresponding to the SUL carrier, transmit a combined HARQ-ACK message to the base station via the preferred carrier.

In a twenty-third aspect, alone or in combination with one or more of the first through sixth aspects, the UL message includes a semi-persistent channel state information (SP-CSI) message.

In a twenty-fourth aspect, in combination with the twenty-third aspect, the first message includes a medium access control (MAC) control element (MAC-CE) indicating activation of a SP-CSI resource at the UE.

In a twenty-fifth aspect, in combination with the twenty-fourth aspect, a particular bit of the MAC-CE is configured to indicate the selected carrier for transmission of the SP-CSI message.

In a twenty-sixth aspect, in combination with one or more of the twenty-fourth through twenty-fifth aspects, the apparatus is configured to, after transmitting the SP-CSI message, receive, from the base station, a second MAC-CE indicating a second selected carrier for SP-CSI transmission.

In a twenty-seventh aspect, in combination with the twenty-sixth aspect, the apparatus is configured to transmit a second SP-CSI message to the base station via the second selected carrier.

In some aspects, an apparatus configured for wireless communication, such as a base station, is configured to select, a carrier from a group of carriers that includes a UL carrier and a SUL carrier. The UL carrier and the SUL carrier correspond to the same cell. The apparatus is also configured to transmit, to a UE, a first message that indicates the selected carrier is for transmission of a UL message. The apparatus is further configured to receive the UL message from the UE via the selected carrier. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a twenty-eighth aspect, the UL carrier and the SUL carrier are associated with the same logical cell index.

In an twenty-ninth aspect, alone or in combination with the twenty-eighth aspect, the UL carrier corresponds to a first set of frequency resources, and the SUL carrier corresponds to a second set of frequency resources.

In a thirtieth aspect, in combination with the twenty-ninth aspect, the second set of frequency resources occupies lower bandwidths than the first set of frequency resources.

In a thirty-first aspect, alone or in combination with one or more of the twenty-eighth through thirtieth aspects, the apparatus is configured to measure a power headroom associated with the UL carrier.

In a thirty-second aspect, in combination with the thirty-first aspect, the apparatus is configured to select the UL carrier as the selected carrier based on the power headroom satisfying a threshold.

In a thirty-third aspect, in combination with the thirty-second aspect, the apparatus is configured to select the SUL carrier as the selected carrier based on the power headroom failing to satisfy the threshold.

In a thirty-fourth aspect, alone or in combination with one or more of the twenty-eighth through thirtieth aspects, the apparatus is configured to receive a first channel state information (CSI) message associated with the UL carrier from the UE.

In a thirty-fifth aspect, in combination with the thirty-fourth aspect, the apparatus is configured to receive a second CSI message associated with the SUL carrier from the UE.

In a thirty-sixth aspect, in combination with the thirty-fifth aspect, the apparatus is configured to determine a carrier associated with a higher channel quality from the UL carrier and the SUL carrier based on the first CSI message and the second CSI message.

In a thirty-seventh aspect, in combination with the thirty-sixth aspect, the apparatus is configured to select the carrier associated with the higher channel quality as the selected carrier.

In a thirty-eighth aspect, alone or in combination with one or more of the twenty-eighth through thirtieth aspects, the apparatus is configured to receive a first sounding reference signal (SRS) from the UE via the UL carrier In a thirty-ninth aspect, in combination with the thirty-eighth aspect, the apparatus is configured to receive a second SRS from the UE via the SUL carrier.

In a fortieth aspect, in combination with the thirty-ninth aspect, the apparatus is configured to determine a carrier associated with a higher channel quality from the UL carrier and the SUL carrier based on the first SRS and the second SRS.

In a forty-first aspect, in combination with the fortieth aspect, the apparatus is configured to select the carrier associated with the higher channel quality as the selected carrier.

In a forty-second aspect, alone or in combination with one or more of the twenty-eighth through forty-first aspects, the apparatus is configured to transmit a configuration message to the UE. The configuration message indicates allocation of a first set of physical uplink control channel (PUCCH) resources corresponding to the UL carrier and allocation of a second set of PUCCH resources corresponding to the SUL carrier.

In a forty-third aspect, in combination with the forty-second aspect, the configuration message includes a radio resource control (RRC) message.

In a forty-fourth aspect, alone or in combination with one or more of the forty-second through forty-third aspects, the first set of PUCCH resources include a first set of frequency resources and a first set of time resources corresponding to at least a portion of the UL carrier. The second set of PUCCH resources include a second set of frequency resources and a second set of time resources corresponding to at least a portion of the SUL carrier.

In a forty-fifth aspect, alone or in combination with one or more of the twenty-eighth through forty-fourth aspects, the UL message includes a hybrid automatic repeat request acknowledgement (HARQ-ACK) message.

In a forty-sixth aspect, in combination with the forty-fifth aspect, the first message includes a downlink control information (DCI) message.

In a forty-seventh aspect, in combination with the forty-sixth aspect, a particular bit of the DCI message is configured to indicate the selected carrier for transmission of the HARQ-ACK message.

In a forty-eighth aspect, alone or in combination with one or more of the forty-sixth through forty-seventh aspects, the DCI message further indicates scheduling of a physical downlink shared channel (PDSCH). The HARQ-ACK message indicates acknowledgment of receipt of the PDSCH at the UE.

In a forty-ninth aspect, in combination with one or more of the forty-sixth through forty-eighth aspects, the apparatus is configured to transmit, to the UE, a second message indicating a second selected carrier for transmission of a second HARQ-ACK message.

In a fiftieth aspect, in combination with the forty-ninth aspect, the apparatus is configured to transmit, to the UE, a third message indicating a third selected carrier for transmission of a third HARQ-ACK message. One or more time resources allocated to physical uplink control channel (PUCCH) resources corresponding to the UL carrier overlap with one or more time resources allocated to PUCCH resources corresponding to the SUL carrier.

In a fifty-first aspect, in combination with the fiftieth aspect, the apparatus is configured to monitor the third selected carrier according to the PUCCH resources allocated to the third selected carrier.

In a fifty-second aspect, in combination with the fifty-first aspect, the apparatus is configured to receive a combined HARQ-ACK message from the UE via the third selected carrier.

In a fifty-third aspect, in combination with the fiftieth aspect, the apparatus is configured to monitor the UL carrier according to the PUCCH resources allocated to the UL carrier based on a determination that the second selected carrier or the third selected carrier is the UL carrier.

In a fifty-fourth aspect, in combination with the fifty-third aspect, the apparatus is configured to receive a combined HARQ-ACK message from the UE via the UL carrier.

In a fifty-fifth aspect, in combination with the fiftieth aspect, the apparatus is configured to determine, from the second selected carrier and the third selected carrier, a carrier associated with a larger PUCCH resource allocation.

In a fifty-sixth aspect, in combination with the fifty-fifth aspect, the apparatus is configured to monitor the carrier associated with the larger PUCCH resource allocation after according to the PUCCH resources allocated to the carrier associated with the larger PUCCH allocation.

In a fifty-seventh aspect, in combination with the fifty-sixth aspect, the apparatus is configured to receive a combined HARQ-ACK message from the UE via the carrier associated with the larger PUCCH allocation.

In a fifty-eighth aspect, alone or in combination with one or more of the twenty-eighth through forty-fourth aspects, the UL message includes a semi-persistent channel state information (SP-CSI) message.

In a fifty-ninth aspect, in combination with the fifty-eighth aspect, the first message includes a medium access control (MAC) control element (MAC-CE) indicating activation of a SP-CSI resource at the UE.

In a sixtieth aspect, in combination with the fifty-ninth aspect, a particular bit of the MAC-CE is configured to indicate the selected carrier for transmission of the SP-CSI message.

In a sixty-first aspect, alone or in combination with one or more of the fifty-ninth through sixtieth aspects, the apparatus is configured to, after receiving the SP-CSI message, transmit, to the UE, a second MAC-CE indicating a second selected carrier for SP-CSI transmission.

In a sixty-second aspect, in combination with the sixty-first aspect, the apparatus is configured to receive a second SP-CSI message from the UE via the second selected carrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to FIGS. 2, 4, 8, and 9 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
receiving, from base station, a first message indicating a selected carrier for transmission of an uplink (UL) message, the selected carrier comprising a UL carrier or a supplementary uplink (SUL) carrier, the UL carrier and the SUL carrier corresponding to a same logical cell index; and
transmitting the UL message to the base station via the selected carrier.

2. The method of claim 1, further comprising receiving a configuration message from the base station, the configuration message indicating allocation of a first set of physical uplink control channel (PUCCH) resources corresponding to the UL carrier and allocation of a second set of PUCCH resources corresponding to the SUL carrier, wherein the first set of PUCCH resources comprise a first set of frequency resources and a first set of time resources corresponding to at least a portion of the UL carrier, and wherein the second set of PUCCH resources comprise a second set of frequency resources and a second set of time resources corresponding to at least a portion of the SUL carrier.

3. The method of claim 1, wherein the UL message comprises a hybrid automatic repeat request acknowledgement (HARQ-ACK) message, wherein the first message comprises a downlink control information (DCI) message that indicates scheduling of a physical downlink shared channel (PDSCH), and wherein the HARQ-ACK message indicates acknowledgment of receipt of the PDSCH at the UE.

4. The method of claim 1, further comprising:
receiving, from the base station, a second message indicating a second selected carrier for transmission of a second hybrid automatic repeat request acknowledgement (HARQ-ACK) message, wherein the UL message comprises a HARQ-ACK message and the first message comprises a downlink control information (DCI) message; and
receiving, from the base station, a third message indicating a third selected carrier for transmission of a third HARQ-ACK message.

5. The method of claim 4, further comprising, based on a determination that one or more time resources allocated to physical uplink control channel (PUCCH) resources corresponding to the UL carrier overlap with one or more time resources allocated to PUCCH resources corresponding to the SUL carrier, transmitting a combined HARQ-ACK message to the base station via the third selected carrier.

6. The method of claim 4, further comprising, based on a determination that one or more time resources allocated to physical uplink control channel (PUCCH) resources corresponding to the UL carrier overlap with one or more time resources allocated to PUCCH resources corresponding to the SUL carrier and a determination that the second selected carrier or the third selected carrier is the UL carrier, transmitting a combined HARQ-ACK message to the base station via the UL carrier.

7. The method of claim 4, further comprising:
determining, from the second selected carrier and the third selected carrier, a carrier associated with a larger physical uplink control channel (PUCCH) resource allocation; and
based on a determination that one or more time resources allocated to PUCCH resources corresponding to the UL carrier overlap with one or more time resources allocated to PUCCH resources corresponding to the SUL carrier, transmitting a combined HARQ-ACK message to the base station via the carrier associated with the larger PUCCH resource allocation.

8. The method of claim 4, further comprising:
measuring a power headroom associated with the UL carrier; and
based on a determination that one or more time resources allocated to physical uplink control channel (PUCCH) resources corresponding to the UL carrier overlap with one or more time resources allocated to PUCCH resources corresponding to the SUL carrier, a determination that the second selected carrier or the third selected carrier is the UL carrier, and a determination that the power headroom satisfies a threshold, transmitting a combined HARQ-ACK message to the base station via the UL carrier.

9. The method of claim 4, further comprising:
measuring a channel quality associated with the second selected carrier;

measuring a channel quality associated with the third selected carrier;

determining a preferred carrier from the second selected carrier and the third selected carrier based on the measured channel qualities; and based on a determination that one or more time resources allocated to physical uplink control channel (PUCCH) resources corresponding to the UL carrier overlap with one or more time resources allocated to PUCCH resources corresponding to the SUL carrier, transmitting a combined HARQ-ACK message to the base station via the preferred carrier.

10. The method of claim 1, further comprising:
scheduling asynchronous transmission of the UL message on the UL carrier or on the SUL carrier.

11. An apparatus configured for wireless communication, the apparatus comprising:
at least one processor; and
a memory coupled to the at least one processor, wherein the at least one processor is configured to:
receive, at a user equipment (UE) from base station, a first message indicating a selected carrier for transmission of an uplink (UL) message, the selected carrier comprising a UL carrier or a supplementary uplink (SUL) carrier, the UL carrier and the SUL carrier corresponding to a same logical cell index; and
initiate transmission of the UL message to the base station via the selected carrier.

12. The apparatus of claim 11, wherein the UL carrier corresponds to a first set of frequency resources, and wherein the SUL carrier corresponds to a second set of frequency resources.

13. The apparatus of claim 12, wherein the second set of frequency resources occupies lower bandwidths than the first set of frequency resources.

14. The apparatus of claim 11, wherein the UL message comprises a semi-persistent channel state information (SP-CSI) message, and wherein the first message comprises a medium access control (MAC) control element (MAC-CE) indicating activation of a SP-CSI resource at the UE.

15. The apparatus of claim 14, wherein the at least one processor is further configured to:
after initiating transmission of the SP-CSI message, receive, from the base station, a second MAC-CE indicating a second selected carrier for SP-CSI transmission; and
initiate transmission of a second SP-CSI message to the base station via the second selected carrier.

16. A method of wireless communication, the method comprising:
selecting, at a base station, a carrier from a group of carriers that includes an uplink (UL) carrier and a supplementary uplink (SUL) carrier, the UL carrier and the SUL carrier corresponding to a same logical cell index;
transmitting, to a user equipment (UE), a first message that indicates the selected carrier is for transmission of a UL message; and
receiving the UL message from the UE via the selected carrier.

17. The method of claim 16, further comprising:
measuring a power headroom associated with the UL carrier; and
selecting the UL carrier as the selected carrier based on the power headroom satisfying a threshold.

18. The method of claim 17, further comprising selecting the SUL carrier as the selected carrier based on the power headroom failing to satisfy the threshold.

19. The method of claim 16, further comprising:
receiving a first channel state information (CSI) message associated with the UL carrier from the UE;
receiving a second CSI message associated with the SUL carrier from the UE;
determining a carrier associated with a higher channel quality from the UL carrier and the SUL carrier based on the first CSI message and the second CSI message; and
selecting the carrier associated with the higher channel quality as the selected carrier.

20. The method of claim 16, further comprising:
receiving a first sounding reference signal (SRS) from the UE via the UL carrier;
receiving a second SRS from the UE via the SUL carrier;
determining a carrier associated with a higher channel quality from the UL carrier and the SUL carrier based on the first SRS and the second SRS; and
selecting the carrier associated with the higher channel quality as the selected carrier.

21. The method of claim 16, further comprising transmitting a configuration message to the UE, the configuration message indicating allocation of a first set of physical uplink control channel (PUCCH) resources corresponding to the UL carrier and allocation of a second set of PUCCH resources corresponding to the SUL carrier, wherein the first set of PUCCH resources comprise a first set of frequency resources and a first set of time resources corresponding to at least a portion of the UL carrier, and wherein the second set of PUCCH resources comprise a second set of frequency resources and a second set of time resources corresponding to at least a portion of the SUL carrier.

22. The method of claim 16, wherein the UL message comprises a hybrid automatic repeat request acknowledgement (HARQ-ACK) message, wherein the first message comprises a downlink control information (DCI) message that indicates scheduling of a physical downlink shared channel (PDSCH), and wherein the HARQ-ACK message indicates acknowledgment of receipt of the PDSCH at the UE.

23. The method of claim 16, further comprising:
transmitting, to the UE, a second message indicating a second selected carrier for transmission of a second hybrid automatic repeat request acknowledgement (HARQ-ACK) message, wherein the UL message comprises a HARQ-ACK message and the first message comprises a downlink control information (DCI) message; and
transmitting, to the UE, a third message indicating a third selected carrier for transmission of a third HARQ-ACK message, wherein one or more time resources allocated to physical uplink control channel (PUCCH) resources corresponding to the UL carrier overlap with one or more time resources allocated to PUCCH resources corresponding to the SUL carrier.

24. The method of claim 23, further comprising:
monitoring the third selected carrier according to PUCCH resources allocated to the third selected carrier; and
receiving a combined HARQ-ACK message from the UE via the third selected carrier.

25. The method of claim 23, further comprising:
monitoring the UL carrier according to PUCCH resources allocated to the UL carrier based on a determination that the second selected carrier or the third selected carrier is the UL carrier; and receiving a combined HARQ-ACK message from the UE via the UL carrier.

26. The method of claim 23, further comprising:

determining, from the second selected carrier and the third selected carrier, a carrier associated with a larger PUCCH resource allocation;

monitoring the carrier associated with the larger PUCCH resource allocation after according to the PUCCH resources allocated to the carrier associated with the larger PUCCH allocation; and receiving a combined HARQ-ACK message from the UE via the carrier associated with the larger PUCCH allocation.

27. An apparatus configured for wireless communication, the apparatus comprising:

at least one processor; and a memory coupled to the at least one processor, wherein the at least one processor is configured to:

select, at a base station, a carrier from a group of carriers that includes an uplink (UL) carrier and a supplementary uplink (SUL) carrier, the UL carrier and the SUL carrier corresponding to a same logical cell index;

initiate transmission, to a user equipment (UE), of a first message that indicates the selected carrier is for transmission of a UL message; and receive the UL message from the UE via the selected carrier.

28. The apparatus of claim 27, wherein the UL carrier corresponds to a first set of frequency resources, and wherein the SUL carrier corresponds to a second set of frequency resources, and wherein the second set of frequency resources occupies lower bandwidths than the first set of frequency resources.

29. The apparatus of claim 27, wherein the UL message comprises a semi-persistent channel state information (SP-CSI) message, and wherein the first message comprises a medium access control (MAC) control element (MAC-CE) indicating activation of a SP-CSI resource at the UE.

30. The apparatus of claim 29, wherein the at least one processor is further configured to:

after receiving the SP-CSI message, initiate transmission, to the UE, of a second MAC-CE indicating a second selected carrier for SP-CSI transmission; and receive a second SP-CSI message from the UE via the second selected carrier.

* * * * *